United States Patent [19]
Kurihara et al.

[11] Patent Number: 4,864,525
[45] Date of Patent: Sep. 5, 1989

[54] MAXIMUM LENGTH SHIFT REGISTER SEQUENCE GENERATOR

[75] Inventors: Takao Kurihara; Masahiro Hamatsu, both of Tokyo, Japan

[73] Assignee: Clarion Co., Ltd., Tokyo, Japan

[21] Appl. No.: 70,491

[22] Filed: Jul. 7, 1987

[30] Foreign Application Priority Data

Jul. 11, 1986 [JP] Japan ................................ 61-163088
Nov. 21, 1986 [JP] Japan ................................ 61-279402

[51] Int. Cl.$^4$ .............................................. G06F 1/02
[52] U.S. Cl. .................................................. 364/717
[58] Field of Search ................... 364/717; 375/115; 380/46; 377/33

[56] References Cited

U.S. PATENT DOCUMENTS

| | | | |
|---|---|---|---|
| 3,515,805 | 6/1970 | Fracassi et al. | 380/46 |
| 3,681,708 | 8/1972 | Olmstead | 380/46 |
| 3,911,216 | 10/1975 | Bartek et al. | 380/46 |
| 3,920,894 | 11/1975 | Shirley et al. | 364/717 |
| 4,023,026 | 5/1977 | O'Farrell | 364/717 |
| 4,304,962 | 12/1987 | Fracassi et al. | 380/46 |
| 4,355,366 | 10/1982 | Portor | 364/717 |
| 4,395,703 | 7/1983 | Piosenka | 364/717 |
| 4,531,022 | 7/1985 | Pioli | 380/46 |
| 4,785,410 | 11/1988 | Hamatsu et al. | 364/717 |

FOREIGN PATENT DOCUMENTS 61-280135 12/1986 Japan .

Primary Examiner—Gary V. Harkcom
Assistant Examiner—Dale M. Shaw
Attorney, Agent, or Firm—Flynn, Thiel, Boutell & Tanis

[57] ABSTRACT

A maximum length shift register sequence generator comprises: (1) an input terminal for feedback (FB 0); (2) an input terminal to the steering gate of the first stage (FB 1); (3) an output terminal from the exclusive OR gate of the last stage (CAS); (4) a three state output terminal from a multiplexer circuit (FB 2); and (5) a control input terminal of a three state output multiplexer circuit ($\overline{FBCNT}$); a plurality of which can be connected in cascade. It includes a flipflop circuit, whose data input is a feedback control signal ($\overline{FBCNT}$) controlling within which maximum length shift register sequence generator the output of the multiplexer circuit should be fedback, when they are connected in cascade, and whose clock input is the strobe pulse (STB), the output of this flipflop circuit being the enable input of the three state output multiplexer circuit. It includes further a logical product gate (AND 0), whose inputs are two signals, one being a latch enable pulse ($\overline{LE}$) for latching, (i) the initial state of the flipflop, (ii) the feedback state, (iii) the last stage selection state for the flipflops, the other being a chip select ($\overline{CS}$), and a demultiplexer circuit distributing the output of this logical product gate (AND 0) to the latch circuits for latching the data (i)~(iii) described above, depending on the two select signals (SEL 0~1).

16 Claims, 5 Drawing Sheets

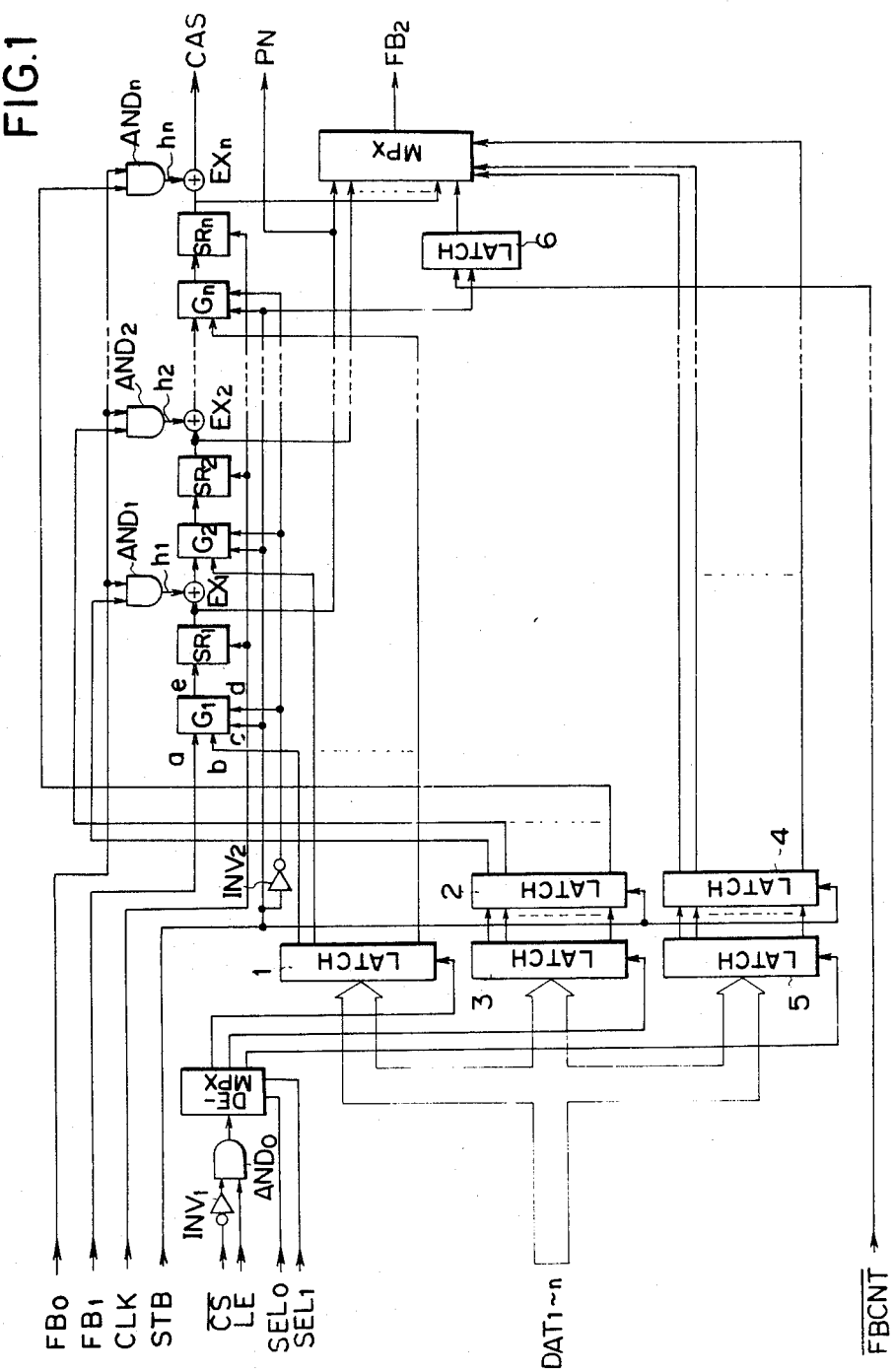

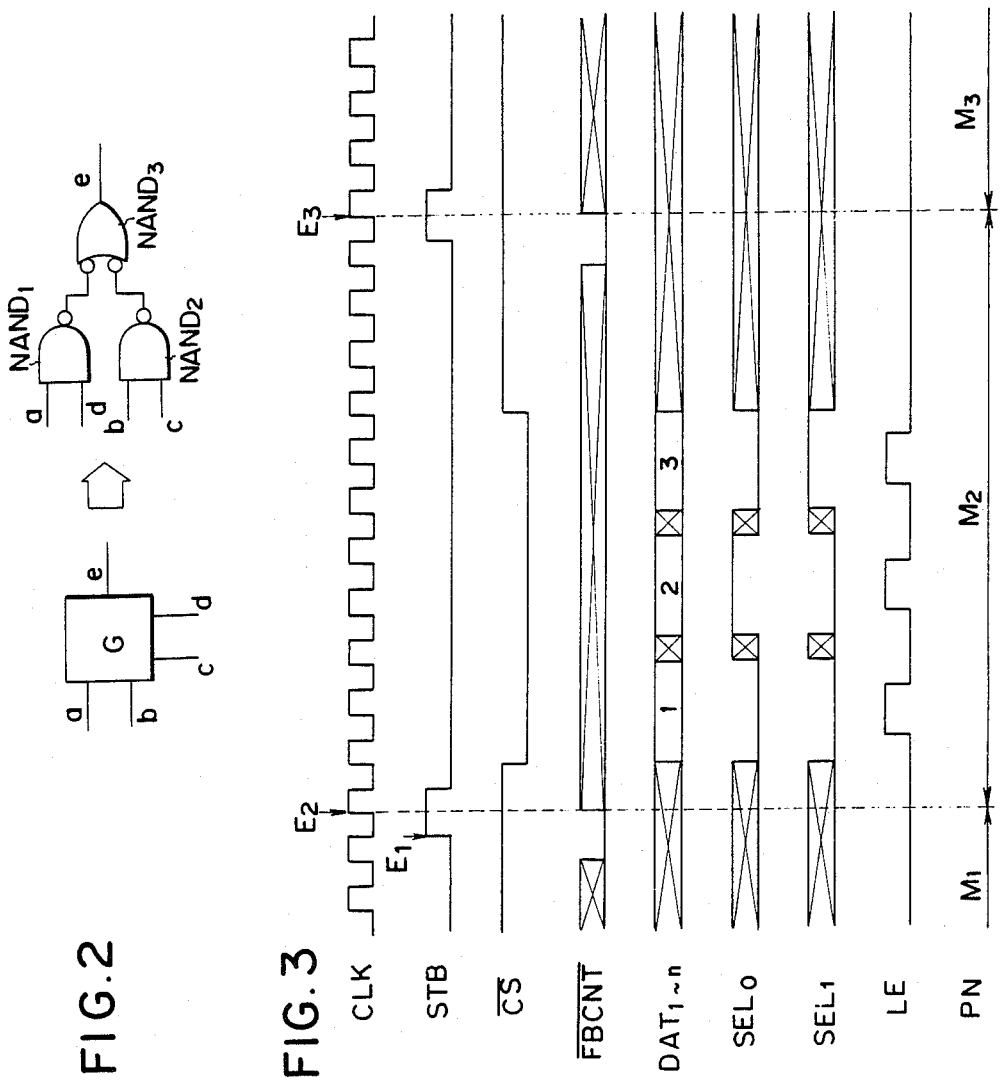

MAXIMUM LENGTH SHIFT REGISTER SEQUENCE GENERATOR

FIELD OF THE INVENTION

This invention relates to a maximum length shift register sequence generator for digital data.

BACKGROUND OF THE INVENTION

As a prior art maximum length shift register sequence generator ( hereinbelow called M sequence generator ) there is known that described in JP-A-No. 60-122071 filed June 5, 1985 by the same applicant.

However the generator described in that application has a construction, in which it is not taken into account to fabricate it in the form of an IC. That is, in the case where it is tried to fabricate it in the form of an IC, the number of stages of flipflops therein should be limited and it is desired to construct it so that a cascade connection is possible among a plurality of such M sequence generators in order to enable it to produce a long recurring sequence even in such circumstances.

OBJECT OF THE INVENTION

The object of this invention is to provide an M sequence generator, which can be fabricated in the form of an IC, which can be connected easily in cascade.

SUMMARY OF THE INVENTION

In order to achieve the above object, an M sequence generator according to this invention, which comprises a plurality of circuits connected in series, each of the circuits consisting of a steering gate, whose input signal is gate-controlled by a strobe pulse, and a flipflop circuit connected with this steering gate and outputting a signal by the rising edge of a clock signal, an AND gate outputting a signal, which is added to the output of the above flipflop, the sum thus obtained being divided by two, second latch means controlled by the strobe pulse described above and giving gate control information to one of the inputs of the AND gate described above, a multiplexer circuit, in which the output of each of the flipflops is inputted and which is provided with a three state output, and fouth latch means controlled by the strobe pulse described above and giving selection information on the last stage of the flipflops to the multiplexer circuit described above, comprises further an AND gate, in which two signals are inputted, one being a latch enable pulse for latching the following data (i)~(iii)
  (i) the initial state of each of the flipflops,
  (ii) the feedback state,
  (iii) the last stage selection state for the flipflops, to first, third and fifth latch means, respectively, the other being a chip select of the M sequence generator, a demultiplexer circuit, whose input is the output of the AND gate, the destination of its output being controlled by two control signals, first latch means controlled by the output of the demultiplexer circuit, holding the data (i) described above, and outputting a signal to one input of each of the steering gates, third latch means controlled by the output of the demultiplexer circuit, holding the data (ii) described above, and outputting a signal to second latch means, fifth latch means controlled by the output of the demultiplexer circuit, holding the data (iii) described above, and outputting a signal to fourth latch means, a feedback output portion of the multiplexer circuit, the other signal input portion of each of the AND gates, the other signal input portion of the first stage of the steering gates, the signal input portion for controlling within which M sequence generator the output of the multiplexer circuit should be made enable, when it is connected in cascade with the output portion of the signal obtained by adding the output of the last stage of the flipflops thereto and by dividing the sum thus obtained by two, and sixth latch means outputting the enable control signal of the multiplexer circuit to the enable input of the multiplexer circuit by using the strobe pulse described above as a trigger.

Furthermore, in an advantageous mode of realization of this invention, an M sequence generator consisting of a group of circuits, in which a plurality of sets are connected in series, each of the sets consisting of switching means controlling the input signal by a strobe signal and a flipflop connected therewith, first latch means latching the initial state of each of the flipflops, an AND gate, one input of which is the output of each of the flipflops, an exclusive OR gate, one input of which is the output of each of the AND gates and the other of which is the output of the following stage except for the last stage, a third latch holding a signal controlling the output of the AND gate, and a second latch, which holds a hold signal of said third latch and sends its output to the other input of the AND gate, comprises further (a) a terminal, which inputs a signal to the other input of the exclusive OR gate corresponding to the AND gate of the last stage;

(b) a terminal for outputting the exclusive OR of the first stage;

(c) an input terminal disposed in the switching means of the first stage; and (d) a terminal for outputting the signal of the flipflop of the last stage.

BRIEF DESCRIPTION OF THE DRAWINGS

FIG. 1 is a block diagram illustrating the construction of an embodiment of the M sequence generator according to this invention;

FIG. 2 shows an example of the construction of a steering gate circuit;

FIG. 3 is a timing chart for explaining the working mode of the generator indicated in FIG. 1;

DETAILED DESCRIPTION

FIG. 1 is a block diagram illustrating the construction of an embodiment of the M sequence generator according to this invention, in which $G_1 \sim G_n$ are steering gate circuits, which can be constructed e.g. by using NAND gates NAND 1~NAND 3 as indicated in FIG. 2; AND 1~AND n are AND gates; SR 1~SR n are flipflop circuits; $EX_1 \sim EX_n$ are exclusive OR gates; 1~6 are latch circuits; MPX is a multiplexer circuit; $INV_1$ and $INV_2$ are inverter circuits; and DE-MPX is a demultiplexer circuit. As initial information necessary for the generation of the sequence in the M sequence generator indicated in FIG. 1 there are the following information (i)~(iii);

(i) the initial state of the flipflops SR 1~SR n,
 (ii) the feedback state, and
 (iii) the last stage selection state for the flipflops.

In FIG. 1 CLK represents a supplied clock; STB a sequence exchange strobe; $\overline{CS}$ a chip select; LE a latch enable; DAT 1~n data (i)~(iii) as stated above; and SEL 0~1 data selects, which selects data (i)~(iii) as indicated in Table 1, depending on whether the respective level is low "L" or high "H". Further, FB 0~2 and CAS are the input and the output for the cascade connection, respectively; FB 2 is a three state output; and PN represents the M sequence output.

TABLE 1

| SEL 1 | SEL 0 | Data |
|---|---|---|
| L | L | (i) |
| L | H | (ii) |
| H | L | (iii) |
| H | H | meaningless |

Now, at first, the working mode of the M sequence generator according to this invention will be explained for the case where it is used alone.

Figure 4:
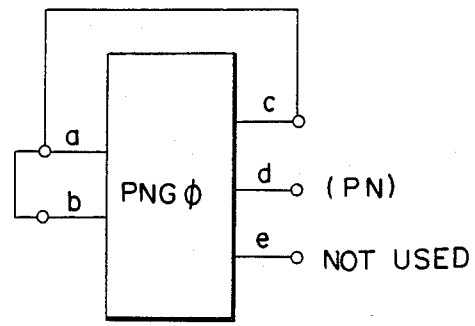
FIG. 4 is a connection diagram, in the case where the generator indicated in FIG. 1 is used alone.

FIG. 4 is the connection diagram in the case where the generator PNG 0 indicated in FIG. 1 is used alone. The working mode of the circuit indicated in FIG. 4 will be explained below, using the timing chart indicated in FIG. 3 and the symbols used in FIG. 1.

Now it is supposed that an M sequence M 1 is outputted from a sequence output terminal PN. When a strobe pulse E1 is inputted, the generator works as follows.

(a) The content of the latch 1 is set at the data input of the flipflops SR 1~SR n through the steering gates $G_1$~$G_n$. These data appear at the output of the flipflops SR 1~SR n by the rising edge $E_2$ of the clock pulse CLK.

Here the content of the latch 1 is the initial state of the flipflops SR 1~SR n.

(b) The content of the latch 3 is outputted from the latch 2 and the control is effected to which exclusive OR gate the feedback input signal from FB 0 should be fedback through the AND gates AND 1~AND n. On the other hand the content of the latch 5 is outputted from the latch 4, and when the latch 6 sets the multiplexer to its enable state by inputting the feedback control $\overline{FBCNT}$ and the strobe pulse STB, the output of the flipflops SR 1~SR n selected, corresponding to the output value of the latch 4, is outputted from FB 2 as the feedback signal.

Here it is supposed that the multiplexer is in the enable state, when the output of the latch 6 is "L", and in the disable state, when the output of the latch 6 is "H".

Further, the content of the latch 3 is the feedback state and the content of the latch 5 is the last stage selection state for the flipflops SR 1~SR n.

(c) As the result of (a) and (b), a new sequence $M_2$ is outputted from the sequence output terminal PN by the clock pulses after $E_2$.

That is, the sequence $M_1$ is changed to the sequence $M_2$.

(d) On the other hand, the strobe pulse STB is used as the interruption pulse to an external circuit such as a microprocessor. The external circuit such as a microprocessor carries out the preparation of the next sequence $M_3$ to be produced by using this interruption pulse as a trigger.

That is, "L" is inputted in the chip select $\overline{CS}$ and the latch enable pulse LE is inputted to the demultiplexer through the AND gate AND 0, which makes the latches 1, 3 ande 5 enable one after another, corresponding to the control signal SEL 0~1 of the demultiplexer.

At this time the data DAT 1~n of (i)~(iii) described above are latched in the latches 1, 3 and 5 one after another so that the preparation for the generation of the sequence $M_3$ is terminated.

When a new strobe pulse STB is inputted, the operations (a)~(c) described above are repeated and a new sequence $M_3$ is outputted from the sequence output terminal PN by clock pulses CLK after $E_3$.

Next, the working mode of the M sequence generator according to this invention will be explained for the case where a plurality thereof are connected in cascade.

The working mode of the generator indicated in FIG. 5, where two M sequence generators indicated in FIG. 1, PNG 1 and PNG 2, are connected in cascade, will be explained below as an example. Table 2 shows the correspondence of the terminals a, b, c, d, and e in FIGS. 4 and 5 to the signals in FIG. 1.

TABLE 2

| PNG 0, PNG 1, PNG 2 | M sequence generator |
|---|---|
| a | FB 0 |
| b | FB 1 |
| c | FB 2 |
| d | PN |
| e | CAS |

When a plurality of generators are used, connected in cascade, the preparation for the M sequence generation described in (d) for the case where one generator is used alone is effected for each of the M sequence generators, by using the chip select $\overline{CS}$.

Then, the multiplexer in the M sequence generator, where the last stage of the flipflops exists, is set in the enable state by using the feedback control $\overline{FBCNT}$ and the sequence is generated by inputting strobe pulses STB in the two M sequence generators.

Here it is supposed that the output of the multiplexer is a three state output. The correspondence between the feedback control $\overline{FBCNT}$ and the accessed M sequence generator is indicated in Table 3.

TABLE 3

| | $\overline{FBCNT}$ 1 | $\overline{FBCNT}$ 2 | Three state output of multiplexer (FB 2) |
|---|---|---|---|
| Access to PNG 1 | L | H | Floating on the side of PNG 2 |
| Access to PNG 2 | H | L | Floating on the side of PNG 1 |

Figure 5:
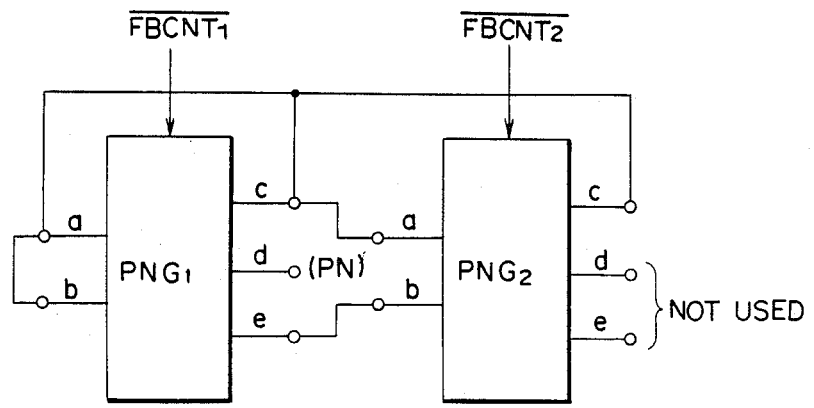
FIG. 5 is a connection diagram, in the case where the generator indicated in FIG. 1 is used together with other identical generators connected in cascade.

Further the connection method indicated in FIG. 5 can be applied to more than two M sequence generators connected in cascade with each other, which permits to generate a longer recurring sequence.

A second embodiment of this invention will be described below, which permits to facilitate the cascade connection thereof and the change over of sequences with a high speed.

Figure 6:
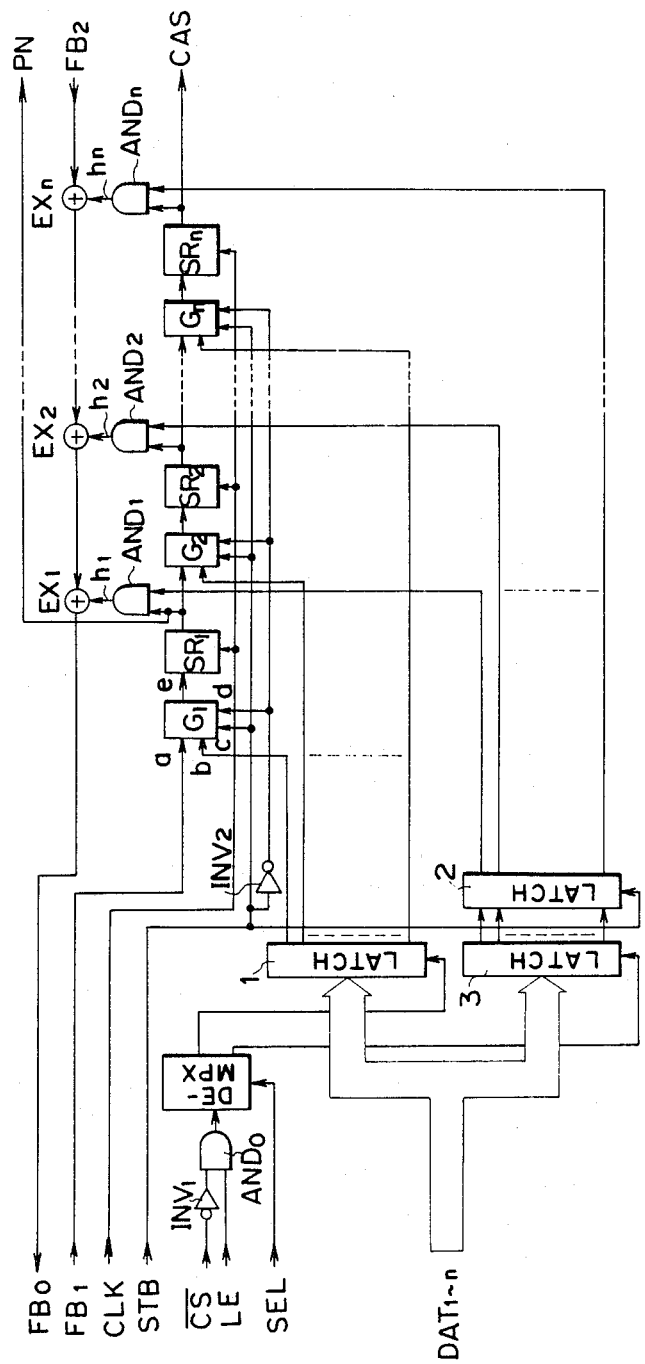
FIG. 6 is a block diagram illustrating the construction of another embodiment of the M sequence generator according to this invention.

FIG. 6 is a block diagram illustrating the construction of the second embodiment of this invention, in which the same symbols as those in FIG. 1 represent the identical or analogous circuits.

(i) In the case where it is used alone

Figure 7:
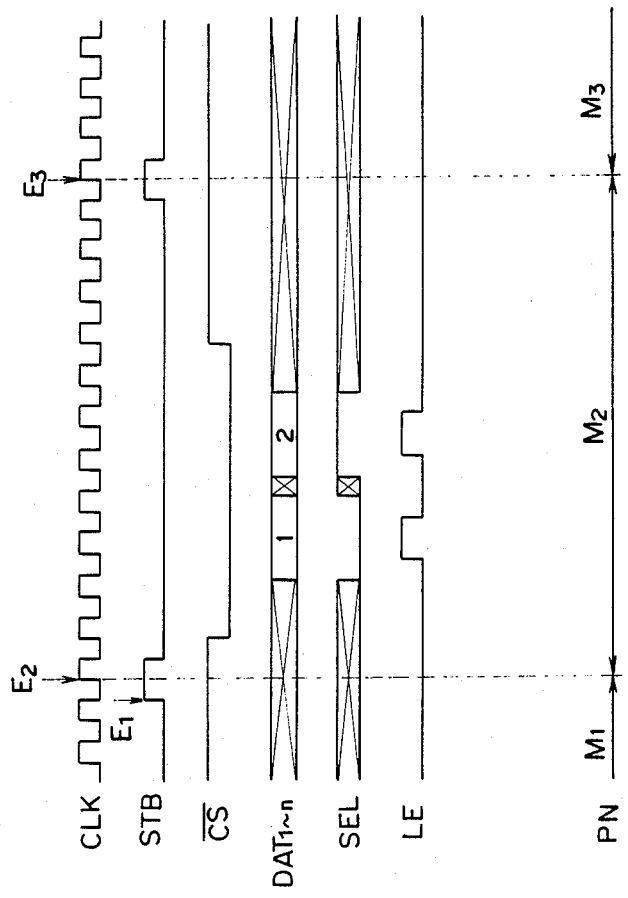
FIG. 7 is a timing chart for explaining the working mode of the generator indicated in FIG. 6.

When the generator indicated in FIG. 6 PNG 0' is used alone, it may be connected as indicated in FIG. 4. The working mode thereof will be explained below, referring to the timing chart shown in FIG. 7.

Now suppose that an M sequence $M_1$ is outputted from the sequence output terminal PN. Then, when a strobe pulse STB $E_1$ is inputted, the generator works as follows.

(a) The content of the latch 1 is set at the data input of the flipflops SR 1~SR n through the steering gates $G_1$~$G_n$. These data appear at the output of the flipflops SR 1~SR n by the rising edge $E_2$ of the clock pulse CLK.

Here the content of the latch 1 is the initial state of the flipflops SR 1~SR n.

(b) The content of the latch 3 is outputted from the latch 2 and the control of the AND gates AND 1~AND n and the control determining which output of the exclusive OR gates is the last stage are effected.

As the result, the feedback lines h 1~h 2 are set in the state, where the sequence $M_2$ can be generated.

Further the content of the latch 3 is the feedback state and the last stage selection state for the flipflops.

(c) As the result of (a) and (b), a new sequence $M_2$ is outputted from the sequence output terminal PN by the clock pulses after $E_2$. That is, the sequence 1 is changed to the sequence $M_2$.

(d) On the other hand, the strobe pulse STB is used as an interruption pulse to an external circuit such as a microprocessor. The external circuit such as a microprocessor carries out the preparation for the next sequence $M_3$ to be produced by using this interruption pulse as a trigger.

That is, "L" is inputted in the chip select $\overline{CS}$ and the latch enable pulse LE is inputted to the demultiplexer DE-MPX through the AND gate AND 0, which makes the latches 1 ande 3 enable one after another, corresponding to the control signal SEL of the demultiplexer.

At this time the data DAT 1~n of the following (i) and (ii) are latched in the latches 1 and 3 one after another so that the preparation for the generation of the sequence $M_3$ is terminated.

(i) the initial state of the flipflops, and (ii) the feedback state and the last stage selection state for the flipflops.

When a new strobe pulse STB is inputted, the operations (a)~(c) described above are repeated and a new sequence $M_3$ is outputted from the sequence output terminal PN by clock pulses CLK after $E_3$.

(ii) In the case where a plurality thereof connected in cascade are used

In the case where two generators indicated in FIG. 6, where e.g. two M sequence generators PNG 1' and PNG 2' are connected in cascade, the preparation for the M sequence generation described in (d) of (i) is effected for each of the M sequence generators by using the chip select $\overline{CS}$.

Then the sequence can be generated by inputting strobe pulses STB in two M sequence generators.

This invention can be applied advantageously to the spread spectrum communication system using M sequence generators, by which desired information transmission is effected by using correlation output between the M sequence coming from the sender side and the M sequence produced at the receiver side and both the M sequences can be changed arbitrarily in their kind and phase on the sender and receiver sides.

As explained above, according to this invention, it is possible to realize ICs, which can be utilized in various manners for forming an M sequence generator. Since a plurality thereof can be connected in cascade, it is possible to generate a longer M sequence.

While particular embodiments of the invention have been shown and described, it will be obvious to those skilled in the art that various changes and modifications may be made without departing from the present invention in its broader aspect.

The embodiments of the invention in which an exclusive property or privilege is claimed are defined as follows:

1. In a maximum length shift register sequence generator which includes:

a plurality of flipflops which each have a clock input, a data input and a data output;

means for applying a clock signal to said clock input of each said flipflop;

a plurality of steering gates each having first and second data inputs, having a data output coupled to the data input of a respective one of said flipflops, and having a select input which specifies which of said data inputs thereof is to be coupled to said data output thereof;

means for applying a strobe signal to said select input of each said steering gate;

a plurality of AND gates each having first and second data inputs and a data output;

first latch means having a plurality of outputs which are each coupled to the second data input of a respective said steering gate;

second latch means having a plurality of outputs which are connected to inputs of third latch means, said third latch means having a plurality of outputs which are each connected to the first data input of a respective said AND gate;

a plurality of further gates which each have a fist data input connected to the data output of a respective said flipflop, a second data input connected to the data output of a respective said AND gate, and a data output, each said steering gate other than one thereof having its first data input connected to the data output of a respective said further gate other than one said further gate;

a multiplexer having a plurality of data inputs which are each coupled to the data output of a respective said flipflop, having a data output, and having select inputs which specify which one of said data inputs thereof is to be coupled by said multiplexer to its data output; and fourth latch means having a plurality of outputs which are coupled to inputs of fifth latch means, said fifth latch means having a plurality of outputs which are each coupled to a respective said select input of said multiplexer; the improvement comprising:

a control AND gate having a first control input to which is applied a latch enable pulse, having a control output producing a signal which latches initial state data, feedback state data and final stage selection data into said first, said third and said fifth latch means, respectively, and having a second control input to which is applied a chip select signal;

a demultiplexer circuit having a control input connected to said control output of said control AND gate, having two select inputs to which are applied respective select signals, and having three control outputs which are respectively connected to control inputs of said first, said third and said fifth latch means, said demultiplexer circuit being responsive to an output signal from said control AND gate for producing a latch signal on a respective one of said control outputs thereof selected by said select inputs thereof;

an input terminal coupled to said second data input of each said AND gate other than said control AND gate;

an input terminal coupled to said first data input of said one steering gate;

an output terminal coupled to said data output of said one of said further gates; and an output terminal coupled to said data output of said multiplexer.

2. In a maximum length shift register sequence generator which includes:

a plurality of flipflops which each have a clock input, a data input and a data output;

means for applying a clock signal to said clock input of each said flipflop;

a plurality of steering gates each having first and second data inputs, having a data output coupled to the data input of a respective one of said flipflops, and having a select input which specifies which of said data inputs thereof is to be coupled to said data output thereof;

means for applying a strobe signal to said select input of each said steering gate;

a plurality of AND gates each having first and second data inputs and a data output;

first latch means having a plurality of outputs which are each coupled to the second data input of a respective said steering gate;

second latch means having a plurality of outputs which are connected to inputs of third latch means, said third latch means having a plurality of outputs which are each coupled to the second data input of a respective said AND gate;

a plurality of further gates which each have a first data input connected to the data output of a respective said flipflop, a second data input connected to the data output of a respective said AND gate, and a data output, each said steering gate other than one thereof having its first data input connected to the data output of a respective said further gate other than one said further gate;

a multiplexer circuit having a plurality of data inputs which are each coupled to the data output of a respective said flipflop and having a three state data output, having select inputs which specify which one of said data inputs thereof is to be coupled by said multiplexer to its data output, and having an enable input which can selectively enable and disable said three state data output; and fourth latch means having a plurality of outputs which are coupled to inputs of fifth latch means, said fifth latch means having a plurality of outputs which are each coupled to a respective said select input of said multiplexer circuit; the improvement comprising:

an input for a control signal for controlling within which maximum length shift register sequence generator the data output of the multiplexer circuit is enabled, when a plurality of said maximum length shift register sequence generators are connected in cascade;

sixth latch means having a signal input to which said control signal is applied, having a signal output connected to said enable input of said multiplexer circuit, and having a control input to which is applied said strobe signal;

an input terminal coupled to said second data input of each of said AND gates;

an input terminal coupled to said first data input of said one of said steering gates; and an output terminal for cascade connection connected to said output of said one of said further gates, said one of said further gates being an exclusive OR gate.

3. In a maximum length shift register sequence generator which includes:

a plurality of flipflops which each have a clock input, a data input and a data output;

means for applying a clock signal to said clock input of each said flipflop;

a plurality of steering gates each having first and second data inputs, having a data output coupled to the data input of a respective one of said flipflops, and having a select input which specifies which of said data inputs thereof is to be coupled to said data output thereof;

means for applying a strobe signal to said select input of each said steering gate;

a plurality of AND gates each having first and second data inputs and a data output;

first latch means having a plurality of outputs which are each coupled to said second data input of a respective said steering gate;

second latch means having a plurality of outputs which are connected to inputs of third latch means, said third latch means having a plurality of outputs which are each connected to the first data input of a respective said AND gate;

a plurality of further gates which each have a first data input connected to the data output of a respective said flipflop, a second data input connected to the data output of a respective said AND gate, and a data output, each said steering gate other than one thereof having its first data input connected to the data output of a respective said further gate other than one said further gate;

a multiplexer having a plurality of data inputs which are each coupled to the data output of a respective said flipflop having a data output, having select inputs which specify which one of said data inputs thereof is to be coupled by said multiplexer to its data output, and having an enable input which can selectively enable and disable said data output; and fourth latch means having a plurality of outputs which are coupled to inputs of fifth latch means, said fifth latch means having a plurality of outputs which are each coupled to a respective said select input of said multiplexer; the improvement comprising:

a control AND gate having a first control input to which is applied a latch pulse, having a control output producing a signal which latches initial state data, feedback state data and last stage selection data into each of said first, said third and said fifth latch means, respectively, and having a second control input to which is applied a chip select signal;

a demultiplexer circuit having a control input connected to said control output of said control AND gate, having two select inputs to which are applied respective select signals, and having three control outputs which are respectively connected to control inputs of said first, said third and said fifth latch means, said demultiplexer circuit being responsive to an output signal from said control AND gate for producing a latch signal on a respective one of said control outputs thereof selected by said select inputs thereof;

an input for a control signal for controlling within which maximum length shift register sequence generator the data output of the multiplexer circuit is enabled, when a plurality of said maximum length shift register sequence generators are connected in cascade;

sixth latch means having a signal input to which said control signal is applied, having a signal output connected to said enable input of said multiplexer circuit, and having a control input to which is applied said strobe signal;

an input terminal coupled to said second data input of each of said AND gates;

an input terminal coupled to said first data input of said one of said steering gates; and an output terminal for cascade connection connected to said output of said one of said further gates, said one of said further gates being an exclusive OR gate.

4. In a maximum length shift register sequence generator consisting of a group of circuits, in which a plurality of sets are connected in series, each of the sets consisting of switching means controlling the input signal by a strobe signal and a flipflop connected therewith, first latch means latching the initial state of each of the flipflops, an AND gate, one input of which is the output of each of the flipflops, an exclusive OR gate, one input of which is the output of each of the AND gates and the other of which is the output of the following stage except for the last stage, a third latch holding a signal controlling the output of said AND gate, and a second latch, which holds a hold signal of said third latch and sends its output to the other input of the AND gate, the improvement wherein it comprises further (a) a terminal, which inputs a signal to the other input of the exclusive OR gate corresponding to said AND gate of the last stage;

(b) a terminal for outputting the exclusive OR of the first stage;

(c) an input terminal disposed in said switching means of the first stage; and (d) a terminal for outputting the signal of the flipflop of the last stage.

5. A maximum length shift register sequence generator according to Claim 4, wherein each of said first and said third latches consists of an AND gate and a demultiplexer.

6. A sequence generator module, comprising:
a plurality of flipflops which each have a clock input, a data input, and a data output;
a clock input terminal connected to said clock input of each said flipflop;
first and second cascade input terminals, and first and second cascade output terminals;
means for coupling said second cascade output terminal to said data output of one of said flipflops;

sequence signal generating means for generating a plurality of sequence signals as a function of said data output of each said flipflop and said first and second cascade input terminals, and for applying to said first cascade output terminal and said data input of each said flipflop a respective said sequence signal; and a sequence output terminal coupled to said data output of a selected said flipflop.

7. The module of claim 6, wherein said means for coupling said second cascade output terminal to said data output of one of said flipflops includes a lead directly connecting said second cascade output terminal to said data output of said one flipflop.

8. The module of claim 6, wherein said means for coupling said second cascade output terminal to said data output of said one of said flipflops includes a circuit having a data input connected to said data output of said one of said flipflops, having a three state output which is connected to said second cascade output terminal, and having an enable input which can selectively enable and disable said three state data output, and includes an enable input terminal which is connected to said enable input of said circuit.

9. The module of claim 8, wherein said circuit is a multiplexer having a plurality of further data inputs which are each coupled to the data output of a respective one of said flipflops other than said one flipflop, and having a plurality of select inputs which specify which of said first-mentioned and further data inputs of said multiplexer is to be coupled by said multiplexer to its data output; and wherein said means for coupling said second cascade output terminal to said data output of said one flipflop includes means for supplying select control signals to select inputs of said mulitplexer.

10. The module of claim 6, wherein said sequence signal generating means includes a first latch having a plurality of outputs, and includes means for varying said function used to generate said sequence signals in response to variations of the data in said first latch.

11. The module of claim 10, including a strobe terminal, and including a second latch having a plurality of outputs, said sequence signal generating means including steering means for facilitating initialization of each said flipflop to a state defined by a respective output of said second latch in response to a strobe signal at said strobe input terminal.

12. The module of claim 11, wherein said sequence signal generating means includes: a plurality of steering gates which each have a first data input, a second data input connected to a respective output of said second latch, a data output connected to the data input of a respective said flipflop, and a select input which selects one of said first and second data inputs thereof to be coupled to said data output thereof and which is connected to said strobe input terminal; a plurality of AND gates which each have a first data input connected to a respective said data output of said first latch, a second data input connected to said first cascade input terminal, and a data output; and a plurality of exclusive OR gates which each have a first data input connected to the data output of a respective said flipflop, a second data input connected to the data output of a respective said AND gate, and a data output, said data output of one of said exclusive OR gates being connected to said first cascade output terminal, said first data input of one of said steering gates being connected to said second cascade input terminal, and each of said steering gates other than said one steering gate having the first data input thereof connected to the data output of a respective said exclusive OR gate other than said one exclusive OR gate.

13. The module of claim 11, wherein said sequence signal generating means includes: a plurality of steering gates which each have a first data input, a second data input connected to a respective output of said second latch, a data output connected to the data input of a respective one of said flipflops, and a select input which selects one of said data inputs thereof to be connected to the data output thereof; a plurality of AND gates which each have a first data input connected to respective said data output of said first latch, a second data input connected to the data output of a respective one of said flipflops, and a data output; and a plurality of exclusive OR gates which each have a first data input, a second data input connected to the data output of a respective said AND gate, and a data output, one of said exclusive OR gates having its data output connected to said first cascade output terminal and a further said exclusive OR gate having its first data input connected to said second cascade input terminal, each said exclusive OR gate other than said further exclusive OR gate having its first data input connected to the data output of a respective said exclusive OR gate other than said one exclusive OR gate, one of said steering gates having its first data input connected to said second cascade input terminal and each said steering gate other than said one steering gate having its first data input connected to the data output of a respective one of said flipflops other than said one flipflop.

14. The module of claim 11, wherein said first and second latches each have a control input and a plurality of data inputs, including a third latch having a control input, a plurality of data inputs, and a plurality of data outputs which are each coupled to a respective said data input of said first latch, including a plurality of data input terminals which are each coupled to a respective one of said data inputs of said first latch and to a respective one of said data inputs of said third latch, and including a latch select terminal, a module select terminal, a latch control terminal, a control AND gate having a first input coupled to said module select terminal, a second input coupled to said latch control terminal, and a data output, and a demultiplexer having a data input connected to said data output of said further AND gate, a select input coupled to said latch select terminal, and two control outputs which are each connected to said control input of a respective one of said first and third latches, said control input of said first latch being connected to said strobe terminal.

15. The module of claim 14, wherein said means for coupling said second cascade output terminal to said data output of said one of said flipflops includes a multiplexer having a plurality of data inputs which are each connected to the data output of a respective one of said flipflops, having a data output which is coupled to said second cascade output terminal, and having a plurality of select inputs specifying which of the data inputs of the multiplexer is to be coupled by the multiplexer to its data output, including a fourth latch having a control input, a plurality of data inputs, and a plurality of data outputs which are each coupled to a respective said select input of said multiplexer, and including a fifth latch having a plurality of data inputs connected to said data input terminals, a control input, and a plurality of data outputs which are connected to said data inputs of said fourth latch, said demultiplexer having a further select input which is coupled to a further latch select input terminal and having a further output which is coupled to said control input of said fifth latch, said control input of said fourth latch being connected to said strobe terminal.

16. The module of claim 15, wherein said multiplexer has a three state output and has an enable input, including a feedback control input terminal, and including a further latch having a data input connected to said feedback control terminal, a data output connected to said enable input of said multiplexer, and a control input connected to said strobe terminal.

* * * * *

UNITED STATES PATENT AND TRADEMARK OFFICE
CERTIFICATE OF CORRECTION

PATENT NO. : 4,864,525

DATED : September 5, 1989

INVENTOR(S) : Takao KURIHARA et al

It is certified that error appears in the above-identified patent and that said Letters Patent is hereby corrected as shown below:

Column 6, line 38; change "fist" to ---first---.

Signed and Sealed this

Twenty-eighth Day of May, 1991

Attest:

HARRY F. MANBECK, JR.

Attesting Officer     Commissioner of Patents and Trademarks